(12) United States Patent
Brot (10) Patent No.: US 8,538,602 B2
(45) Date of Patent: Sep. 17, 2013

(54) FLIGHT CONTROL SYSTEM AND AIRCRAFT COMPRISING IT

(75) Inventor: Patrice Brot, Ramonville Saint-Agne (FR)

(73) Assignee: AIRBUS Operations S.A.S., Toulouse (FR)

( * ) Notice: Subject to any disclaimer, the term of this patent is extended or adjusted under 35 U.S.C. 154(b) by 160 days.

(21) Appl. No.: 13/103,319

(22) Filed: May 9, 2011

(65) Prior Publication Data

US 2011/0276199 A1    Nov. 10, 2011

(30) Foreign Application Priority Data

May 10, 2010   (FR) ...................... 10 53634

(51) Int. Cl.
| | |
|---|---|
| G05D 1/00 | (2006.01) |
| G06F 7/00 | (2006.01) |
| G06F 17/00 | (2006.01) |
| G01C 23/00 | (2006.01) |
| B64C 19/00 | (2006.01) |
| B64C 3/18 | (2006.01) |
| B64C 13/04 | (2006.01) |

(52) U.S. Cl.
USPC ................. 701/3; 701/1; 244/75.1; 244/76 R; 244/221

(58) Field of Classification Search
USPC ................. 244/17.13, 175, 194, 223; 700/20, 700/21, 3, 4; 701/1, 14, 29.1, 29.2, 3, 31.7; 709/208, 220, 224, 228, 248; 710/107, 110; 714/11, 12, 54
See application file for complete search history.

(56) References Cited

U.S. PATENT DOCUMENTS 5,274,554 A * 12/1993 Takats et al. ................. 701/29.2
5,377,334 A * 12/1994 Boldt et al. ................... 710/110

(Continued)

FOREIGN PATENT DOCUMENTS

| EP | 0 617 348 A2 | 9/1994 |
| EP | 0 617 348 A3 | 9/1994 |
| EP | 0 742 507 A1 | 11/1996 |

OTHER PUBLICATIONS

Sghairi et al. Architecture Optimization based on Incremental Approach, IEEE, Sep. 4, 2008, p. 13-19.*

(Continued)

*Primary Examiner* — Fadey Jabr
*Assistant Examiner* — Kevin P Mahne
(74) *Attorney, Agent, or Firm* — Oblon, Spivak, McClelland, Maier & Neustadt, L.L.P.

(57) ABSTRACT

A flight control system for an aircraft, in which control commands are transmitted between a flight control module and at least one actuator of a movable flight surface, the flight control module including at least one first and one second computer, each computer being adapted for computing, for each actuator, a control command established according to at least one predetermined law for control of the flight surface controlled by the actuator. Each actuator including at least two logic units adapted for receiving commands originating from all the computers, each logic unit being adapted for: comparing the commands received between them, and according to the result of the comparison, choosing in accordance with a predetermined logic common to all the actuators, a computer, referred to as master computer, whose control command is validated for execution by the actuator considered; and transmitting, to all the computers, a master computer choice information item; and in that each computer is adapted for self-determining as being a master computer or otherwise as being a computer referred to as slave, on the basis of master computer choice information items received from all the actuators, a sole master computer among all the computers finally being determined.

10 Claims, 5 Drawing Sheets

(56) References Cited

U.S. PATENT DOCUMENTS

| | | | |
|---|---|---|---|
| 6,839,393 B1* | 1/2005 | Sidiropoulos | 375/371 |
| 7,789,345 B2* | 9/2010 | Matsui et al. | 244/99.4 |
| 2003/0195673 A1* | 10/2003 | Foch et al. | 701/3 |
| 2006/0074500 A1* | 4/2006 | Naik et al. | 700/21 |
| 2007/0083301 A1* | 4/2007 | Yeh | 701/3 |
| 2007/0135975 A1* | 6/2007 | Stange et al. | 701/3 |
| 2007/0164166 A1* | 7/2007 | Hirvonen | 244/175 |
| 2008/0126885 A1* | 5/2008 | Tangvald et al. | 714/54 |
| 2008/0208399 A1 | 8/2008 | Pham | |
| 2010/0204853 A1* | 8/2010 | Sghairi et al. | 701/4 |
| 2010/0205398 A1* | 8/2010 | Maeda et al. | 712/31 |
| 2010/0211258 A1* | 8/2010 | Sakurai et al. | 701/31 |
| 2010/0222943 A1 | 9/2010 | Sghairi et al. | |
| 2011/0066305 A1* | 3/2011 | Lin et al. | 701/3 |
| 2011/0191497 A1* | 8/2011 | Anugu et al. | 709/248 |
| 2011/0290938 A1* | 12/2011 | Matsui et al. | 244/99.4 |
| 2012/0101663 A1* | 4/2012 | Fervel et al. | 701/3 |
| 2012/0109424 A1* | 5/2012 | Fervel et al. | 701/3 |
| 2012/0232679 A1* | 9/2012 | Abercrombie et al. | 700/44 |
| 2012/0290153 A1* | 11/2012 | Olsoe et al. | 701/3 |

OTHER PUBLICATIONS

Sghairi et al. Distributed and Reconfigurable Architecture for Flight Control System, IEEE, Oct. 23, 2009, p. 6.B.2-1-6.B.2-10.*

Ahlstrom, et al., Future Architecture of Flight Control Systems, IEEE 2002, p. 21-27.*

French Preliminary Search Report issued Feb. 21, 2011, in French 1053634, filed May 10, 2010 (with English Translation of Categories of Documents).

* cited by examiner

Fig. 5

FLIGHT CONTROL SYSTEM AND AIRCRAFT COMPRISING IT

BACKGROUND OF THE INVENTION

This invention relates to flight control systems (Flight Control Systems) present in aircraft.

These flight control systems are at the interface between the flying components (control stick, rudder bar, etc.) and the various movable flight surfaces of the aircraft (such as the rudders, elevators, ailerons, stabilizers, etc.).

Modern airliners have flight control systems of "fly by wire" type in which mechanical actions on the flying components are converted into signals transmitted to actuators controlling the movement of the flight surfaces, these commands being transmitted to the actuators by advanced computers.

These commands are computed according to several types of laws. One of these laws, called normal law, is an assisted flying law that reprocesses the flying instructions provided by the flying components in order to optimize flying conditions (passenger comfort, stabilization of the airplane, protection of the performance envelope, etc.). Another law, referred to as direct law, is a law that only retranscribes the instructions for movement of the airplane transmitted by the electrical flight controls without reprocessing these signals with a view to improving flying performance.

Figure 1:
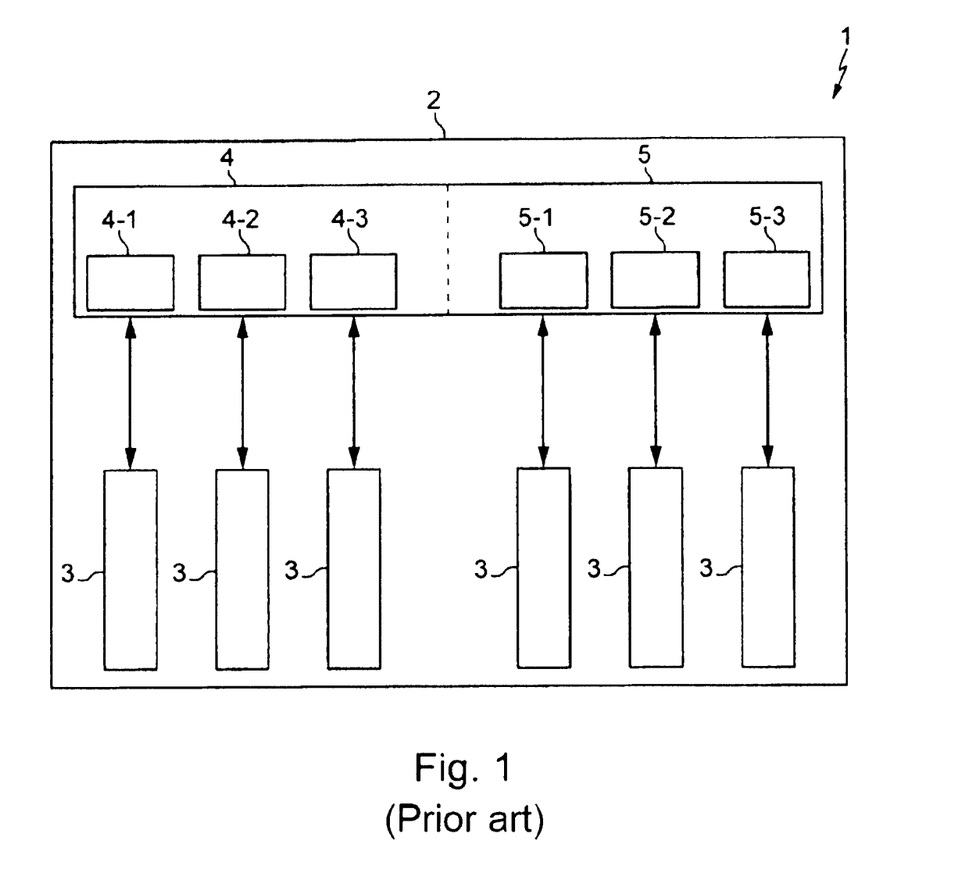
FIG. 1 is a schematic representation of a flight control system according to the prior art described above.

There already is known, as illustrated on FIG. 1, a flight control system 1 comprising a control module 2 having two sets of computers 4 and 5 in order to determine the control commands to be transmitted to actuators 3.

Set 4 comprises two computers 4-1 and 4-2 able to compute the control of actuators 3 established according to the normal and direct control laws (these computers are called primary computers) and a computer 4-3 only able to compute this control established according to the direct law (this computer is called secondary computer).

Set 5 comprises one primary computer 5-1 and two secondary computers 5-2 and 5-3.

All these computers are installed in an avionic bay and communicate with the actuators via direct point-to-point analog links.

The actuators are connected to one or two computers, with in the case of two computers a "master/standby" architecture, the master computer ascertains the validity of the control signal transmitted to the actuator which ensures the integrity of the device. When the master computer breaks down, the "standby" computer takes over, which ensures that a computer is always available.

In order to ascertain the validity of its command, each computer has a structure with a dual computation unit (it is a matter of dual-track computers also called "duplex" computers), not illustrated on FIG. 1.

The first unit is a control unit (COM) which implements the processing necessary for performance of the functions of the computer, namely to determine a control signal to an actuator.

The second unit is a monitoring or checking unit (MON) which for its part carries out the same types of operations, the values obtained by each unit then being compared and, if there is a deviation that exceeds an authorized tolerance threshold, the computer is automatically disabled. It then becomes inoperative and is declared faulty so that another computer may take its place in order to implement the functions abandoned by this faulty computer.

Each computer thus is designed for detecting its own failures and inhibiting the corresponding outputs while signaling its condition.

The hardware of the primary and secondary computers is different so as to minimize the risks of simultaneous failure of all the computers (hardware dissimilarity).

In addition, the hardware of the two tracks (COM and MON) of each computer is identical but for reasons of safety, the software packages of these two tracks are different so as to ensure a software dissimilarity.

SUMMARY OF THE INVENTION

The invention is intended to provide a flight control system which has an architecture modified in relation to that of the prior art descried above, at the same time less costly in hardware and software resources while meeting the same safety and availability requirements as the system of the prior art.

To this end, the invention proposes a flight control system for an aircraft, in which control commands are transmitted between a flight control module and at least one actuator of a movable flight surface, the flight control module comprising at least one first and one second computer, each computer being adapted for computing, for each actuator, a control command established according to at least one predetermined law for control of the flight surface controlled by the actuator.

In accordance with the invention, the proposed system is noteworthy in that each actuator comprises at least two logic units adapted for receiving commands originating from all the computers, each logic unit being adapted for:
  comparing between them the commands received, and according to the result of the comparison, choosing in accordance with a predetermined choice logic common to all the actuators, a computer, referred to as master computer, whose control command is validated for execution by the actuator considered; and
  transmitting, to all the computers, a master computer choice information item;
  and in that each computer is adapted for self-determining as being a master computer or otherwise as being a computer referred to as slave, on the basis of master computer choice information items received from all the actuators, a sole master computer among all the computers finally being determined.

The implementation, in each of the logic units of each actuator, of the same logic for choice of a master computer, associated with the use of computers capable of being self-determining as master or slave computer on the basis of choice information items transmitted by the actuators, makes it possible to end up with the choice of a single master computer for all the actuators.

Furthermore, in the system according to the invention, since the comparison of the commands from the computers no longer is carried out at these computers but at each actuator, each actuator thus is able to determine by itself, on the basis of the computer commands that are transmitted thereto, the action to be executed on the movable flight surface (in practice, the amplitude of movement of this surface), that is to say the one corresponding to the control command of the computer chosen as master.

In this way each actuator also is able, by virtue of the logic units that it comprises, to determine which commands to use as a basis in order to define the action to be executed and to reject the commands whose comparison with the other commands shows that they present an anomaly.

According to a specific characteristic of the invention, each computer comprises verification means adapted for verifying, for each actuator, the coherence of the master computer choice information items obtained respectively from each of the logic units of the actuator considered, and if said information items are not coherent, for ignoring these information items.

In this way, if the logic units associated with an actuator choose different master computers—which indicates a probable malfunction of the actuator—the choice information items transmitted by this actuator are not taken into account by the computers in order to self-determining as master or slave.

According to another characteristic of the invention, if the choice of master computer made by each logic unit of a given actuator is the same, the control command of the master computer chosen is executed by the actuator, otherwise the actuator is disabled.

Thus, since the determination of the action to be executed is moved to the actuator, this also makes it possible to produce simpler and less costly computers while providing a greater flexibility for layout of the system. This makes it possible, in particular, to be free from the "COM/MON" and "master/standby" architectures of the prior art, which significantly minimizes the total number of computers, while retaining a high level of safety.

According to another characteristic of the invention, each computer comprises a control string including at least one integrator, each computer being adapted, when it is self-determined as being a slave computer, for synchronizing the integrator of its control chain with that of the master computer finally determined.

By automatically synchronizing the integrators of the slave computers with those of the single master computer, according to the invention, the possible divergence of the integrators of the slave computers thus is remedied. In fact, the servo-control loops, including the integrators, of the master computer are stable since the commands are applied by the actuators and the airplane responds physically to the servo-control; on the other hand, since the commands generated by the slave computers are not applied, their integrator may diverge.

Furthermore, the characteristic according to which a sole master computer is finally chosen associated with the characteristic according to which the other computers (slaves) are synchronized automatically with the single master computer, endows the invention with more simplicity in comparison with the prior art, while retaining a high level of safety.

According to optional characteristics of the invention:
the logic units of each actuator also are adapted, for each computer, for sending back or not sending back a message of failure of the computer, according to the result of the comparison of commands.
the system comprises a plurality of actuators and each computer is adapted for disabling itself when it receives failure messages originating from a number of actuators exceeding a predetermined number.

Since the actuators are able to compare the commands of the computers among themselves, they are capable of detecting which computers are faulty and of sending a message back to them to so inform them.

In the system according to the invention, the functions carried out by the MON unit of the duplex structure computers of the prior art thus are implemented by the actuators jointly with the other computers by virtue of which it becomes possible to use computers which have only one track (computers referred to as "simplex," that is to say devoid of redundant processors) instead of two ("duplex" computers).

According to still other characteristics of the invention:
each comparison of commands carried out by an actuator logic unit concerns commands originating from computers computing their control command according to a different program;
on the other hand, the logic units of each actuator also are adapted, when all the still operational computers are computing the control command according to the same program, for sending a request for software reconfiguration to one of the still operational computers so that it may function according to a program different from that of the other still operational computers.

In this way, on the one hand, the taking into account of the software dissimilarity of the computers for comparison of the commands makes it possible to increase the reliability of the system and, on the other hand, the software reconfiguration makes it possible to maximize the use of each computer, which contributes to minimizing the total number of computers while retaining, for the same control law, a software dissimilarity among computers.

According to still other embodiment characteristics of the invention:
each actuator comprises a control unit and a unit for monitoring the control unit;
each unit is connected to the first computer and to the second computer; and/or
one of the units is only connected to the first computer and the other unit is only connected to the second computer, the control and monitoring units also being connected to each other.

Contact of the control and monitoring units of the actuators with the sets of computers thus may be implemented directly or indirectly (through the other unit).

According to a second aspect, the invention also applies to an aircraft equipped with a flight control system such as explained above.

BRIEF DESCRIPTION OF THE DRAWINGS

The explanation of the invention now will be continued with the detailed description of an exemplary embodiment, presented below with an illustrative but non-limitative intent, with reference to the attached drawings, on which.

DETAILED DESCRIPTION OF THE INVENTION

Figure 2:
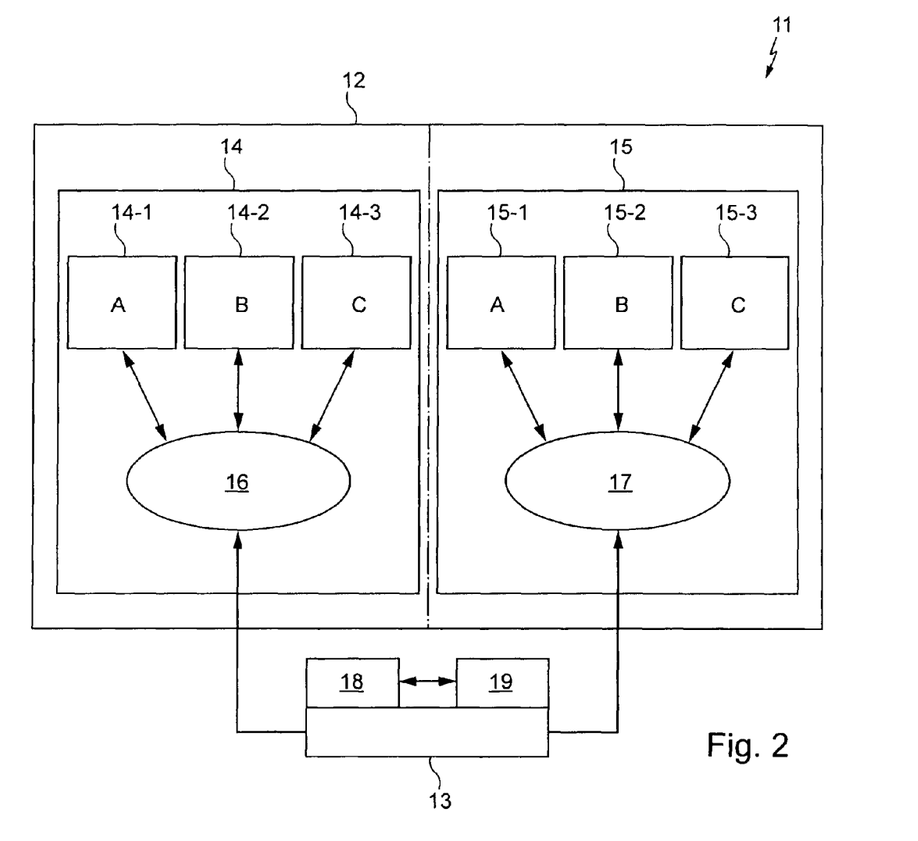
FIG. 2 is a schematic view of a flight control system according to the invention.

A flight control system 11, according to an embodiment of the invention illustrated on FIG. 2, presents a control module 12 for transmitting commands to a plurality of actuators 13.

Control module 12 comprises six "simplex" computers (they have only one track and one computation processor) distributed in two sets 14 and 15 of three computers (FCC, Flight Control Computer), each set being connected to each of actuators 13 (FCRM, Flight Control Remote Module).

Set of computers 14 (respectively 15) communicates with actuators 13 via a digital data-exchange component 16 (respectively 17) the structure of which will be explained in detail below with the aid of FIGS. 3 and 4.

Set of computers 14 (respectively 15) comprises two primary computers (PRIM for PRIMary flight control and guidance computer) 14-1 and 14-2 (respectively 15-1 and 15-2) making it possible to compute control commands according to the normal law and according to the direct law as well as a secondary computer (SEC for SECondary flight control computer) 14-3 (respectively 15-3) for computing control commands on the basis of the direct law alone.

The primary and secondary computers are of different hardware design so as to meet safety requirements (hardware dissimilarity).

Primary computers 14-1 and 14-2 (respectively 15-1 and 15-2) function with two program variants A and B for computation according to the normal and direct laws which are different from one another, while computer 14-3 (respectively 15-3) functions for computation according to the direct law with a program variant C different from variants A and B.

In this way computation according to the normal law is achieved by two different programs (A and B) while computation according to the direct law also is achieved by two different programs (B and C or A and C or A and B). Software dissimilarity therefore is effectively ensured for determination of control signals, which ensures a high level of safety.

As will be seen below, each computer may be reconfigured on the spot according to failures.

These sets of computers are located in an avionic bay (the avionic bay is the space in which most of the electronic equipment items of an airplane are grouped together, generally situated underneath the useful space of the airplane) and are supplied by two separate electrical systems.

Each actuator 13 comprises two tracks 18 and 19 (COM track and MON track) connected to two sets of computers 14 and 15 so that each actuator communicates via its tracks 18 and 19 with all the computers.

Track 18 (control unit COM) performs voting and selection functions and track 19 (monitoring unit MON) for its part carries out the same types of operations so that, at the end, the values obtained by each unit are compared and, in case of disagreement, the actuator is disabled.

According to the logic architecture of actuators 13, referred to as "architecture with master computer selected by the actuators," all the computers (primary and secondary) of the two sets of computers 14 and 15 compute the flying laws in order to generate commands for control of the movable flight surfaces. At each cycle, each computer computes the instructions for all the valid actuators, and transmits the commands via components 16 and 17 to all units 18 and 19 of all the actuators and this irrespective of the validity of the commands computed by each computer.

In the example illustrated, each actuator 13 therefore receives per set of computers two commands for the normal law (originating from computers 14-1 and 14-2 for set 14 and from computers 15-1 and 15-2 for set 15) and three commands for the direct law (originating from computers 14-1 to 14-3 for set 14 and from computers 15-1 to 15-3 for set 15), so that, before the first failure, each actuator 13 has four instructions for the normal law and six instructions for the direct law.

From all these instructions, each of the two logic units 18 and 19 of each actuator 13 performs voting operations.

The voting algorithm is based on the commands from the computers and is implemented in each unit 18 and 19 (COM or MON) of each of the actuators (FCRM).

Each of the logic units 18 and 19 (COM and MON) of each actuator 13 (FCRM) compares two by two the commands received from all the computers (FCC) 14-$i$, 15-$i$ ($i=1, 2, 3$).

According to the exemplary embodiment described, two commands intended for the same movable surface to be actuated and originating from two separate computers (FCC) are considered as coherent or incoherent depending on whether their difference (in absolute value) is above or below a predefined monitoring threshold (marked Delta), for a predefined period, referred to as confirmation period.

According to the invention, in order to guarantee the taking into consideration of the software dissimilarity of the computers, each comparison of commands concerns commands originating from computers equipped with a different software package.

According to the invention, two command comparison functions are defined, marked CL-Normal(FCCx, FCCy) and CL-Direct(FCCx, FCCy) defined as follows.

The function CL-Normal(FCCx, FCCy) is intended to determine the coherence for the normal law of commands originating from computers FCCx and FCCy, while the function CL-Direct(FCCx, FCCy) is intended to determine the coherence for the direct law of commands originating from computers FCCx and FCCy. In practice, the aforesaid functions send back the values 'TRUE' or 'FALSE' depending on whether the two commands compared are coherent or not.

According to the embodiment explained:

The function CL-Normal(FCCx, FCCy) sends back the value 'FALSE' if:
  The command for the normal law of computer FCCx is not available, OR
  The command for the normal law of computer FCCy is not available, OR
  The difference (in absolute value) between the two commands for the normal law of computers FCCx and FCCy is greater than monitoring threshold Delta, confirmed during a certain time T, and locked beyond time T' greater than T. The parameters Delta, T and T' are adjusted beforehand.

Otherwise the function CL-Normal(FCCx, FCCy (sends back the value 'TRUE.'

Similarly, the function CL-Direct(FCCx, FCCy) sends back the value 'FALSE' if:
  The command for the direct law of computer FCCx is not available, OR
  The command for the direct law of computer FCCy is not available, OR
  The difference (in absolute value) between the two commands for the direct law of computers FCCx and FCCy is greater than the monitoring threshold Delta, confirmed during a certain time T, and locked beyond time T' greater than T.

Otherwise the function CL-Direct(FCCx, FCCy) sends back the value 'TRUE.'

It will be noted here that the fact that the command from a computer may not be available for the normal law or the direct law corresponds in particular to a self-declared failure situation of the computer concerned.

By using the two comparison functions defined above, each of the logic units (COM or MON) 18 and 19 of any actuator, determines a master computer (FCC), that is to say the computer whose command to be applied, according to a predetermined choice logic used by the logic units of all the actuators, an example of which is synthesized by the table provided below:

| CONDITION | MASTER COMPUTER | TYPE OF LAW |
|---|---|---|
| C1. If CL-Normal(FCC 14-1, FCC 15-2) is TRUE, then: | FCC 14-1 | Normal |
| C2. Otherwise, if CL-Normal(FCC 14-1, FCC 14-2) is TRUE, then: | FCC 14-2 | Normal |
| C3. Otherwise, if CL-Normal(FCC 15-1, FCC 14-2) is TRUE, then: | FCC 15-1 | Normal |
| C4. Otherwise, if CL-Normal(FCC 15-1, FCC 15-2) is TRUE, then: | FCC 15-2 | Normal |
| C5. Otherwise, if CL-Normal(FCC 14-1, FCC 15-1) is TRUE after reconfiguration of the software of FCC 15-1 as software 'B,' then: | FCC 14-1 | Normal |
| C6. Otherwise, if CL-Normal(FCC 14-2, FCC 15-2) is TRUE after reconfiguration of the software of FCC 15-2 as software 'A,' then: | FCC 15-2 | Normal |
| C7. Otherwise, if CL-Direct(FCC 14-3, FCC 15-3) is TRUE, then: | FCC 14-3 | Direct |
| C8. Otherwise, if CL-Direct(FCC 14-1, FCC 15-2) is TRUE, then: | FCC 14-1 | Direct |
| C9. Otherwise, if CL-Direct(FCC 14-1, FCC 14-2) is TRUE, then: | FCC 14-2 | Direct |
| C10. Otherwise, if CL-Direct(FCC 15-1, FCC 14-2) is TRUE, then: | FCC 15-1 | Direct |
| C11. Otherwise, if CL-Direct(FCC 15-1, FCC 15-2) is TRUE, then: | FCC 15-2 | Direct |
| C12. Otherwise, if CL-Direct(FCC 14-1, FCC 14-3) is TRUE, then: | FCC 14-1 | Direct |
| C13. Otherwise, if CL-Direct(FCC 14-2, FCC 14-3) is TRUE, then: | FCC 14-2 | Direct |
| C14. Otherwise, if CL-Direct(FCC 15-1, FCC 14-3) is TRUE, then: | FCC 15-1 | Direct |
| C15. Otherwise, if CL-Direct(FCC 15-2, FCC 14-3) is TRUE, then: | FCC 15-2 | Direct |
| C16. Otherwise, if CL-Direct(FCC 14-1, FCC 15-3) is TRUE, then: | FCC 14-1 | Direct |
| C17. Otherwise, if CL-Direct(FCC 14-2, FCC 15-3) is TRUE, then: | FCC 14-2 | Direct |
| C18. Otherwise, if CL-Direct(FCC 15-1, FCC 15-3) is TRUE, then: | FCC 15-1 | Direct |
| C191. Otherwise, if CL-Direct(FCC 15-2, FCC 15-3) is TRUE, then: | FCC 15-2 | Direct |

The choice logic illustrated by the above table takes into account the degradation of the laws, since the normal law is favored in relation to the direct law (degraded law), the instructions shown by the table to be applied according to a descending priority from high to low starting from the first line or condition in the table. Thus, if a condition Ci produces the result 'FALSE,' the following condition Ci+1 is tested, and so on, up to the condition for which the result is 'TRUE.' The master computer selected then is the one corresponding to this last condition.

Although an actuator (FCRM) may be affected only by the command governing the functioning of the control surface that it controls, according to the invention each actuator receives all the commands transmitted by each of the computers (FCC), that is to say the commands intended for all the control surfaces of the airplane. Consequently, each actuator performs its own selection of a master computer by taking into account all the information items transmitted by the computers, and as soon as two computers are mutually incoherent for a given command, these computers then are considered by the actuator as being incoherent as a whole, that is to say incoherent for all the commands received, and the following condition in the list of priorities (above table) is systematically examined.

As all the logic units of the actuators use the same selection logic on all the commands received from the computers, in the end a single master chosen by all the valid actuators is obtained.

In the exemplary logic provided above, it will be noted that the master computer chosen advantageously varies from one condition to another.

In fact, when a master computer breaks down, that is to say transmits an erroneous command, the latter is applied by all the control surfaces of the airplane, which generally causes a swerving of the airplane (undesired performance). Very rapidly, as soon as the detection threshold (monitoring threshold) of the failure is reached, the current condition "jumps" and the following condition (in the table) is taken into account, a new master computer then is selected. Consequently, the command applied to the aircraft becomes valid again and sound performance of the airplane is restored.

If for example, in the above table, two successive conditions might lead to selection of the same master computer, in the event of failure of this computer, the time for return to a sound performance of the airplane therefore would be longer, since it would be necessary to process two successive conditions in order to change the master computer, instead of only one according to the invention.

Once the selection of the master is made, each of the logic units (18, 19) COM and MON transmits to all the computers an information item identifying the master computer chosen.

According to a specific embodiment of the invention, it may be provided that once a master computer is selected, each actuator (FCRM) performs an additional verification consisting in comparing the commands of all the non-master computers with those of the master computer and, in the event of deviation confirmed by comparing commands, the computer whose command shows the confirmed deviation is permanently excluded (locked).

On the other hand, if the choice of master computer made by each logic unit (18, 19) of a given actuator is the same, the control command of the master computer chosen is executed by the actuator, otherwise the actuator is disabled. An actuator whose two logic units MON and COM have chosen the same master computer is designated in the context of this explanation as "coherent actuator."

As far as computers are concerned, each valid computer (14-1, 14-2, 14-3, 15-1, 15-2, 15-3) receives the master computer choice information items received from all the actuators, and self-determines as being the master computer if the information items that it receives identify it as such; otherwise it self-determines as being a non-master computer, designated as "slave computer." Given that the choice information items are transmitted by all the logic units of all the valid actuators, in order to determine itself as a master computer or not, each computer first verifies, for each actuator, the coherence of the master computer choice information items obtained respectively from each of the logic units of the actuator considered, and if the said information items are not coherent, the actuator is declared "incoherent," and the information items originating from the actuator considered are ignored.

Furthermore, as mentioned above, it will be noted that the choice logic illustrated by the above table takes into account the software dissimilarity of the computers, since each comparison concerns commands originating from two computers equipped with a different software package. For example, for the first condition (C1), commands originating from computers 14-1 and 15-2 which are respectively equipped with programs A and B for the normal law (see FIG. 2), are compared. On the other hand, each logic unit (18, 19) of a given actuator (13) is adapted, when all the still operational computers are computing the control command according to the same program, for sending a request for software reconfiguration to one of the still operational computers so that it may function according to a program (software A or B) different from that of the other still operational computers.

At each cycle of reception of control commands transmitted by the computers, each COM or MON unit of the actuators verifies the choice conditions according to the order of priority. If according to the order of priority, conditions C1 to C4 tested successively produce the result 'FALSE,' in this case computers 14-1 and 15-1 are considered as being faulty. In addition, as none of conditions C1 to C4 is met, none of primary computers 14-1, 14-2, 15-1, 15-2 can be chosen as master computer for the normal law, therefore all actuators (FCRM) go over to direct law mode on testing condition C7.

The two conditions C5 and C6 are applied for a following cycle only after software reconfiguration of computer 15-1 as software B or of computer 15-2 as software A, respectively.

For example, if computers 14-1 and 15-1 are declared lost (self-detected failure), then only primary computers 14-2 and 15-2, which are equipped with the same computation software, B, are available any more. In this case, all actuators (FCRM) send to computer 15-2 a request for software reconfiguration as software version A.

Computer 15-2 identifies at least one request for reconfiguration as being valid, according to an exemplary embodiment, because the request originates from a "coherent" actuator, that is to say an actuator whose master choice information items are coherent between two logic units of the actuator. The computer, in this example computer 15-2, is reconfigured as software A, then sends to actuators (FCRM) an information item indicating that it is reconfigured as software A.

During the following cycle of reception of commands, condition C6 on the table may give rise to a 'TRUE' result since computer 15-2 has been reconfigured as software A. In this case, the master computer selected may be computer (FCC) 15-2 and the law applied again will become the normal law.

Similarly, if computers 14-2 and 15-2 which are functioning with software B are declared faulty, a request for software reconfiguration as software B will be sent to computer 15-1, so that condition C5 in the table may be applicable.

It will be noted that the problem of absence of software dissimilarity does not arise for computation of the direct law because this law may be computed by each of the computers according to three programs (A, B or C), so that even if two computers functioning with the same program break down, the software dissimilarity is still retained (A and B, A and C, or B and C).

The logic for selection of a master computer explained above is provided by way of example only; it may be provided, for example, to use any similar choice logic obtained by circular permutation of computers (FCC) whose commands are compared.

Furthermore, it also may be provided to use a different selection logic for actuators (FCRM) in charge of lateral control (which would select a master FCC for the lateral normal law) and for the longitudinal control actuators (which would select a master FCC for the longitudinal normal law).

Figure 3:
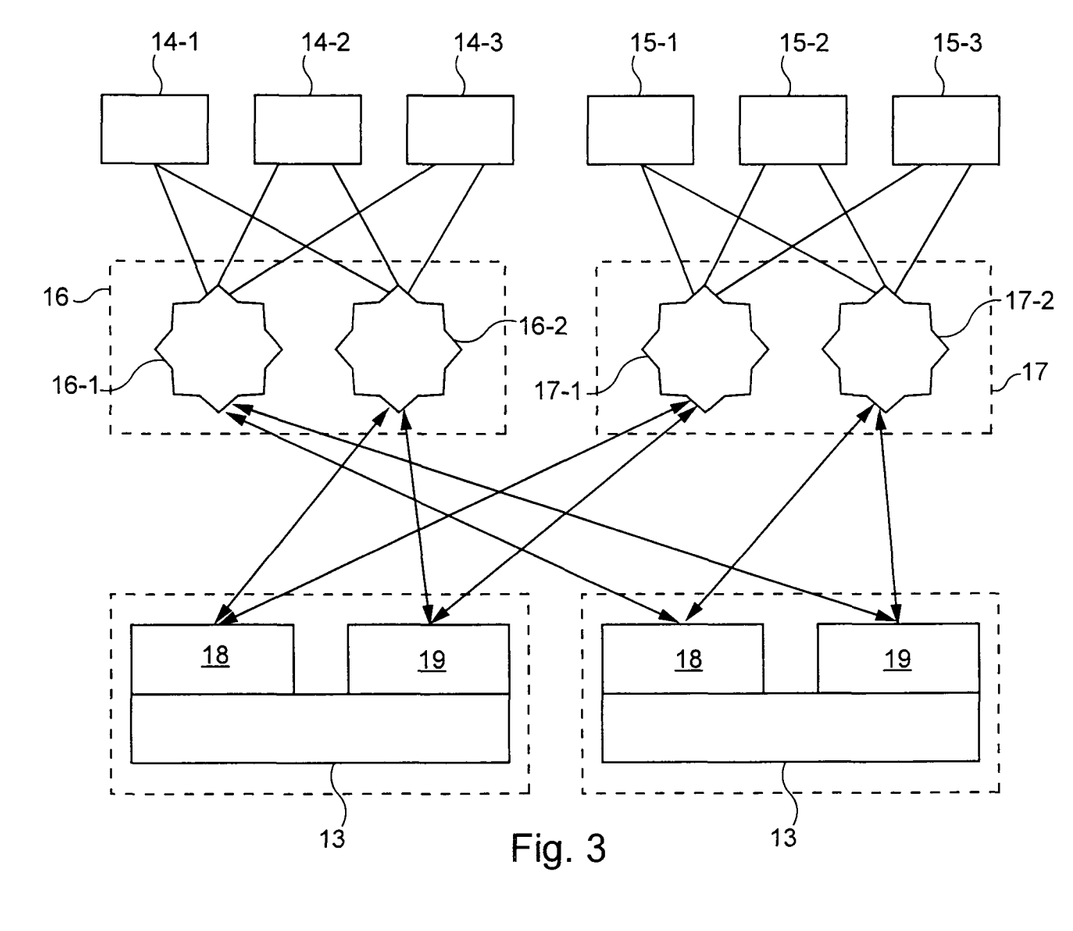
FIG. 3 is a view detailing the communication network allowing transfer of information from sets of computers that comprise the system according to the invention to the actuators of this system.

An exemplary communication network between the computers of module 12 and actuators 13 now is going to be described with the aid of FIG. 3.

This network comprises two data exchange components 16 and 17.

Component 16 (respectively 17) comprises two elements 16-1 and 16-2 (respectively 17-1 and 17-2), each element comprising a 100 Mbit/s AFDX (Avionics Full DupleX switched ethernet) bus, situated in an avionic bay or elsewhere in the fuselage of the airplane and connected to a micro-bus (with an output of 10 Mbits/s) situated near the actuators (these buses are not illustrated on the Figure). These buses were developed and standardized to meet the specifications for the aeronautical field.

The AFDX networks are based on the principle of switched networks, that is to say that the actuators and the computers in charge of data transmission or reception are organized around switches through which these data pass in transit.

These networks form a digital link between the computers and the actuators, the multiplexing of data achieved in this way making it possible to have each computer communicate easily with each actuator (which was not the case with the device of the prior art where the links between the computers and the actuators were point-to-point analog links).

Each component 16 and 17 is connected to each unit 18 and 19 of each actuator 13, so that each unit 18 and 19 is directly connected with each computer via the AFDX and micro-bus buses.

Figure 4:
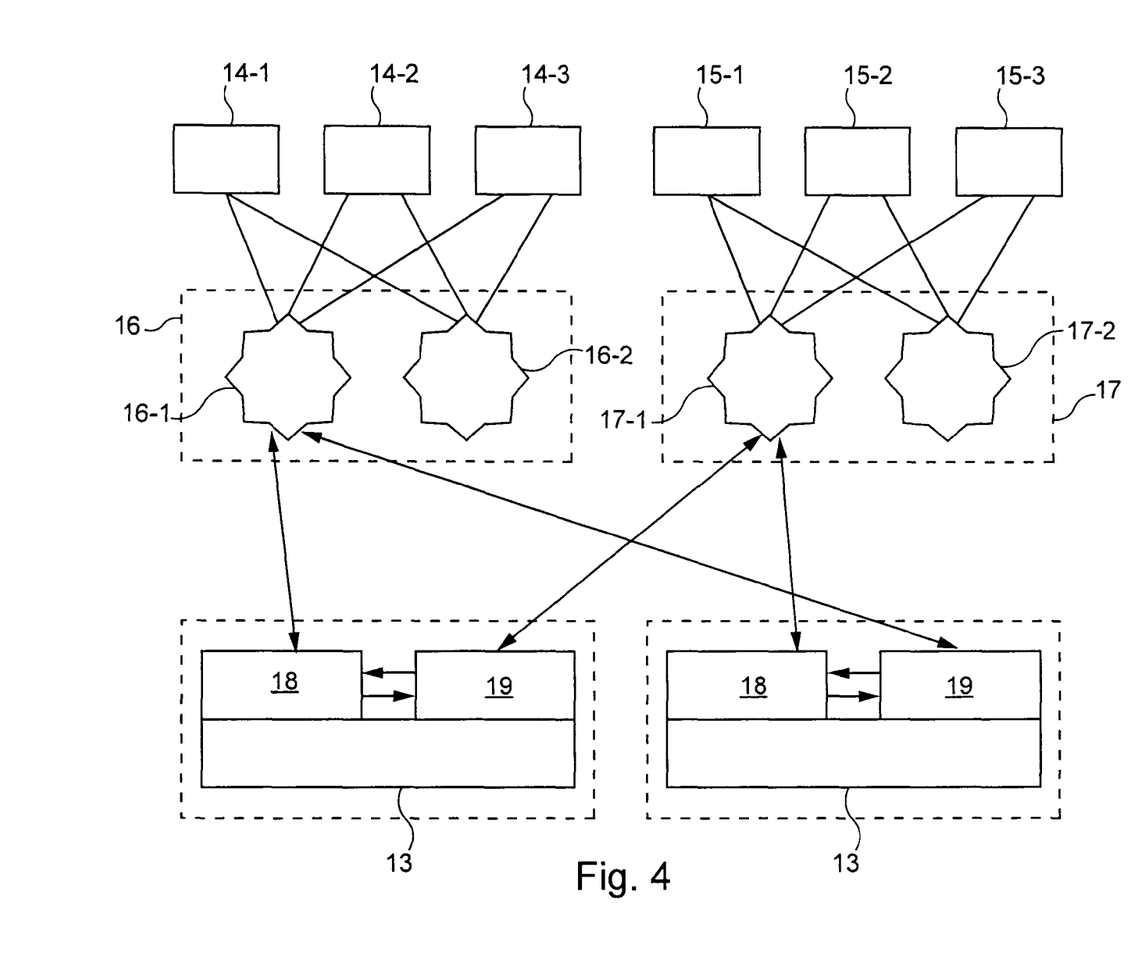
FIG. 4 is a view similar to FIG. 3 but for a variant of the communication network.

In a variant illustrated on FIG. 4, unit 18 of each actuator is only connected to one of the sets of computers while unit 19 is connected to the other of the sets of computers, with units 18 and 19 which are connected to one another so that, all the same, unit 18 may communicate with the set of computers to which it is not directly connected through unit 19 and vice versa.

As a variant, units 18 and 19 of each actuator may share the same mediums for communicating with the computer, by using CRCs (Cyclic Redundancy Check) referred to as applicative, for signing their messages.

It also is possible to use other types of buses such as ARINC (Aeronautical Radio INCorporated) buses or any other type of communication component allowing digital multiplexing between the computers and the actuators, provided that these are compatible with the specifications in the aeronautical field.

In still another variant, it is not the normal and direct laws that are implemented in the computers, but any other type of law such as, for example, a law which, unlike the direct law, would be only partially degraded in relation to the normal law (following loss of signals from the airplane sensors, for example).

Finally, it will be recalled that the number of computers is variable according to needs and is not limited to the number described in the examples illustrated on FIGS. 2 to 4.

Figure 5:
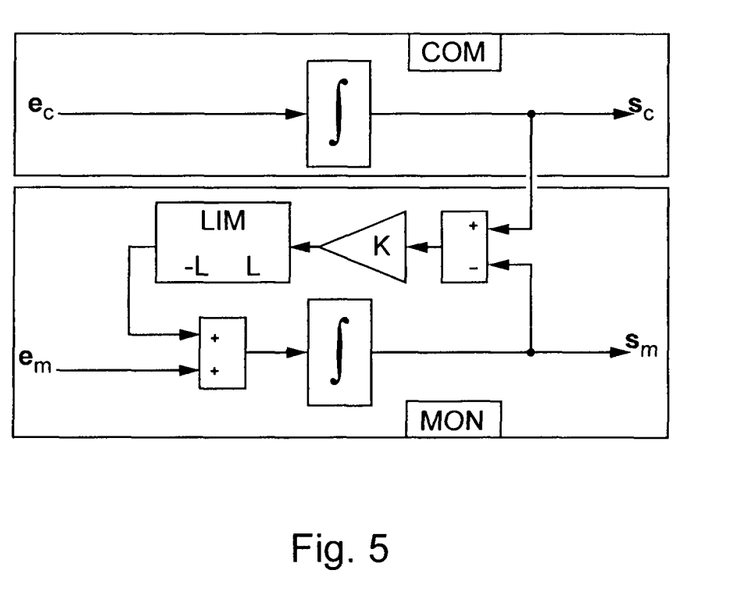
FIG. 5 schematically illustrates the principle of synchronization of the MON track with the COM track in a computer according to a COM/MON architecture of the prior art.

FIG. 5 schematically illustrates the principle of synchronization of the MON track with the COM track in a computer according to a COM/MON architecture of the prior art.

The normal law seeks to slave a flight parameter of the airplane (load factor, attitude, roll rate, . . . ) to an instruction (resulting from the command of the pilot or of the automatic pilot). For the purpose of improving the precision of these servo-controls, integrators are installed within the control strings of the computers, in order to cancel out static error. As the servo-control for the MON unit is not executed (open loop) and it comprises integrators, the latter eventually may shift (integration of a given fixed deviation). In order to overcome this divergence of the integrators of the MON units, the latter are synchronized with the outputs of integrators of the COM unit, as shown on FIG. 5.

In the context of this invention, in order to respond to this synchronization problem, each computer is adapted, when it is self-determined as being a slave computer, for synchronizing the integrator of its control string with that of the finally determined master computer. In the embodiment described and illustrated, this synchronization takes up the known method of synchronization, such as illustrated on FIG. 5.

The flight control system according to the invention advantageously may be supplemented by an external computer, designated as "diagnostic computer" dedicated to the identification of computers (FCC) of the control system that are faulty. This diagnostic computer, for example a computer of known FCDC (Flight Control Data Concentrator) type, may consist of a partition of the integrated modular avionics (IMA—Integrated Modular Avionics).

According to the invention, it is provided that this additional computer determines the master FCC computer according to the same choice algorithm as the one applied by the actuators (FCRM). Such a diagnostic computer is adapted for comparing the information items transmitted by all the FCC computers with the information items transmitted by the (sound) master FCC computer, which enables it to detect an FCC computer with erroneous performance. According to an exemplary embodiment, once the aforesaid comparison is made, the diagnostic computer displays on a display device, a screen for example, the functioning state of each FCC computer, for example by using the following classification: Master; sound Slave (coherent with the master); erroneous Slave (incoherent with the master); Lost (self-detected failure).

The invention claimed is:

1. A flight control system for an aircraft, in which control commands are transmitted between a flight control module and at least one actuator of a movable flight surface of the aircraft, the system comprising:
    at least one first and at least one second computer in the flight control module, each of the at least one first and second computers configured to compute, for each actuator, a control command established according to at least one predetermined law for control of the flight surface controlled by the actuator;
    each actuator includes at least two logic units configured to receive orders originating from all the computers of the flight control module, and each logic unit is configured to:
    compare the commands received between the at least two logic units, and according to the result of the comparison, choose in accordance with a predetermined logic common to all the actuators, a master computer, whose control command is validated for execution by the actuator considered; and
    transmit, to all the computers, a master computer choice information item,
    wherein each computer of the flight control module is configured to determine whether it is a master computer or a slave computer, on the basis of master computer choice information items received from all the actuators, and a sole master computer is determined from among all the computers.

2. The flight control system according to claim 1, in which each computer of the flight control module includes a verification unit configured to verify, for each actuator, the coherence of the master computer choice information items obtained respectively from each of the logic units of the actuator considered, and if the information items are not coherent, to ignore these information items.

3. The flight control system according to claim 1, wherein if the choice of the master computer made by each logic unit of a given actuator is the same, the control command of the master computer chosen is executed by the actuator, otherwise the actuator is disabled.

4. The flight control system according to claim 3, wherein each computer includes a control string including at least one integrator, each computer configured to, when it is self-determined as being a slave computer, synchronize the integrator of its control string with that of the master computer that is finally determined.

5. The flight control system according to claim 1, wherein each comparison of commands concerns commands originating from computers computing their control command according to a different program.

6. The flight control system according to claim 1, wherein the logic units of each actuator are configured to, when all still operational computers are computing the control command according to a same program, send a request for software reconfiguration to one of the still operational computers so that it may function according to a program different from that of the other still operational computers.

7. The flight control system according to claim 1, wherein the logic units of each actuator consist of a control unit and a monitoring unit for monitoring the control unit.

8. The flight control system according to claim 7, wherein both the control unit and the monitoring unit are connected to the at least one first computer and to the at least one second computer.

9. The flight control system according to claim 7, wherein one of the control unit and the monitoring unit is only connected to the at least one first computer and the other unit is only connected to the second computer, the control and monitoring units also being connected to one another.

10. An aircraft equipped with a flight control system according to claim 1.

* * * * *